UNITED STATES PATENT OFFICE.

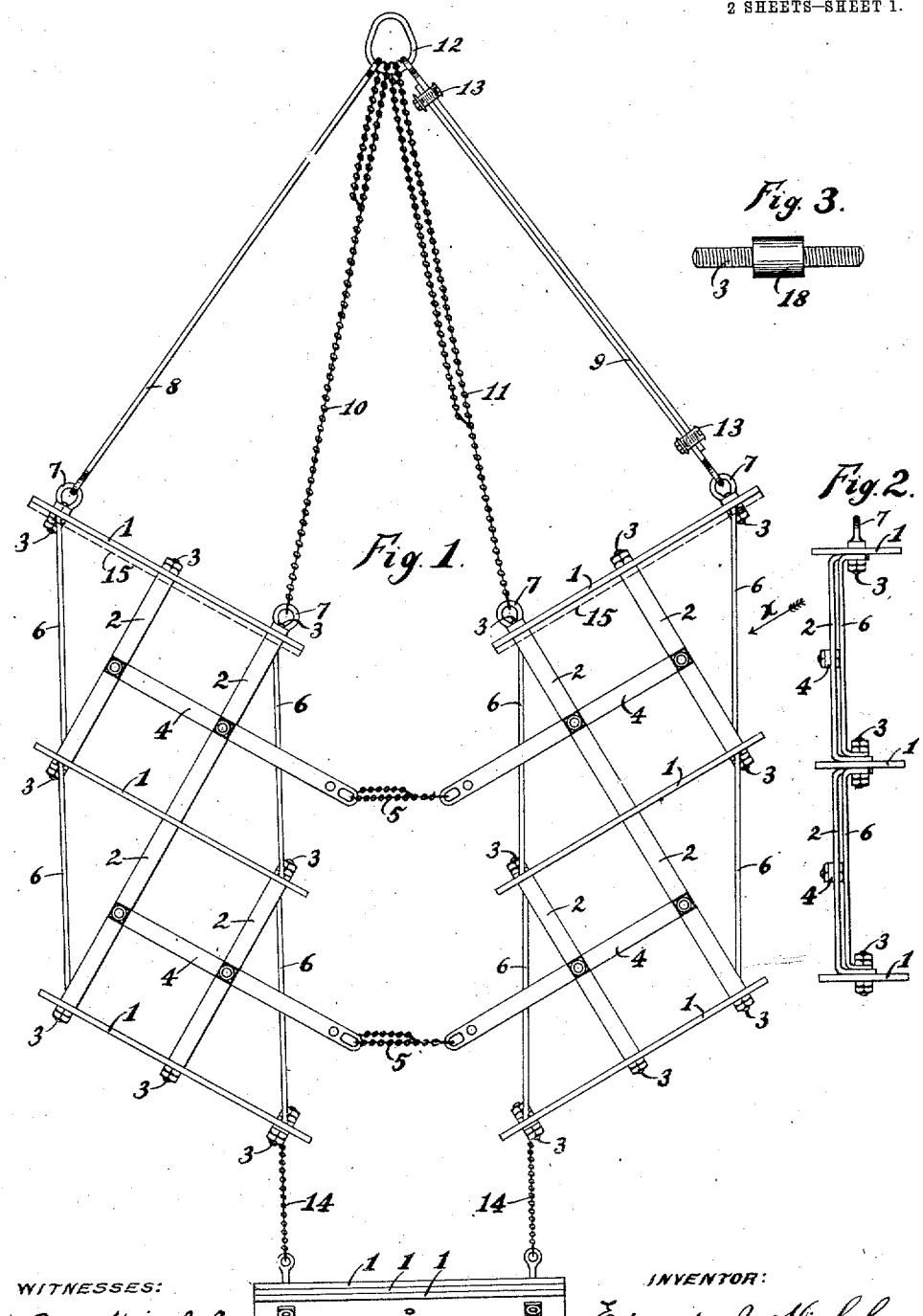

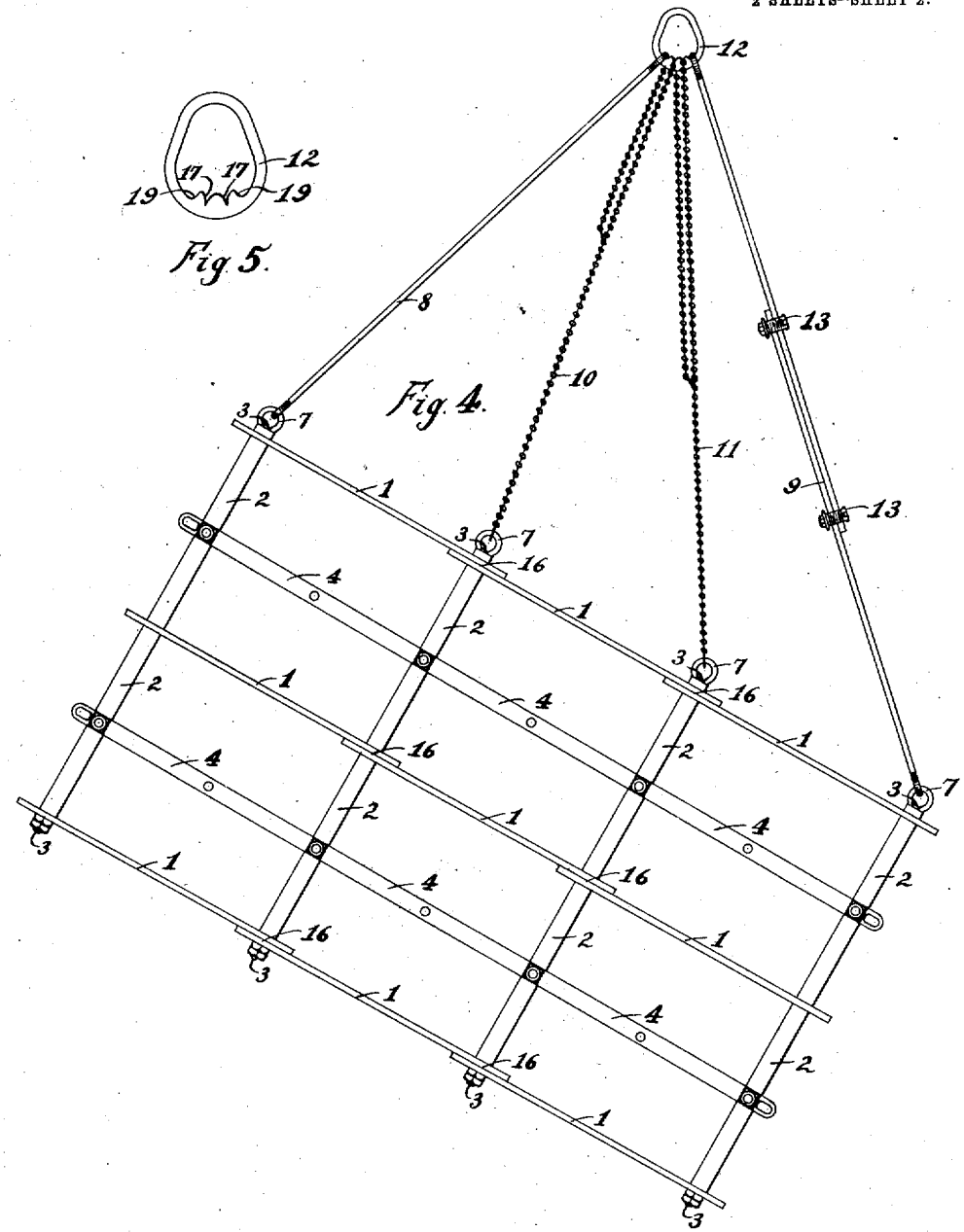

EDWARD J. HICKOK, OF CHICAGO, ILLINOIS.

ROAD-DRAG.

987,803.  Specification of Letters Patent. Patented Mar. 28, 1911.

Application filed April 2, 1910. Serial No. 552,988.

*To all whom it may concern:*

Be it known that I, EDWARD J. HICKOK, a citizen of the United States of America, residing at Chicago, in the county of Cook and State of Illinois, have invented a new and useful Road-Drag, of which the following is a specification, reference being had to the accompanying drawings, illustrating same.

My invention relates to drags, such as are used for dragging roads, fields, etc.

The principal objects of my invention are, to provide an improved drag as will be hereinafter more fully described, and to provide a drag which may be converted into two distinct types of drags, as will be hereinafter shown.

Other objects will be apparent from the following specification.

In the accompanying drawings illustrating the preferred form of my invention, Figure 1 is a plan view of the complete drag of the invention, in the form used for dragging the whole road at once; Fig. 2 is an elevation of a portion of the drag shown in Fig. 1, looking in the direction of arrow *x*; Fig. 3 is a side elevation of one of the bolts used in the drag for holding the drag plates in place; Fig. 4 is a plan view of the drag of the invention, in the form used for dragging only one-half of the road at once; and Fig. 5 is a plan view of the preferred form of draft ring used on the drags of Figs. 1 and 4.

Like characters refer to like parts in the several figures.

In the drawings 1 1 are the drag plates, which are suitably spaced from each other and held in upright or vertical positions by the spacing bars 2 2, the latter being held in place by bolts 3 3 as shown. In the drag shown in Fig. 1, cross bars or braces 4 4 are connected across the spacing bars 2 2 preferably as shown, the inner ends of the bars 4 4 being connected together by adjustable chains 5 5 as shown, to hold the halves of the drag from spreading apart when in use. The drag shown in Fig. 1 is also provided with longitudinal braces 6 6 connected between the drag plates 1 1 as shown, to help firmly brace the whole. To the forward ends of the front bolts 3 3 are attached ring nuts 7 7, to which the draft rods 8 9 and the adjustable draft chains 10 11 are attached. These draft rods and chains are connected to the draft ring 12 preferably as shown, to which ring a team of horses may be hitched for drawing the drag. The rod 9 and the chains 10 11 are adjustable in length, for the purpose of varying the backward slope of the drag plates 1 1 and also for the purpose of converting the drag of Fig. 1 into the drag of Fig. 4 as will be hereinafter described. The overlapping portions of the rod (or double rod) 9 are secured together by suitable clamps 13 13 which permit of the adjustment of the rod 9 as desired.

To the rear of the drag of Fig. 1 and between the halves thereof are suspended drag plates 1 1 1 by short chains 14 14. These drag plates 1 1 1 are used in the position shown in Fig. 1 for leveling off the middle ridge formed by the halves of the drag of Fig. 1. They are also used in the drag of Fig. 4 for building up part of the drag as shown. A pair of the rear drag plates 1 1 1 may also be placed directly behind the front drag plates 1 1 in the drag of Fig. 1, as shown in dotted lines at 15 15, for increasing the weight of the front of the drag. Other arrangements and uses of the rear drag plates 1 1 1 may also be employed.

The drag of Fig. 1 is especially adapted for road dragging, to straddle the road and grade or level off the whole thereof at once, the halves of the drag grading or leveling off the wheel ruts and double horse paths while the rear drag plates 1 1 1 level off the single horse path and the middle ridge formed by the backwardly sloping halves of the drag. This form of drag is especially adapted for narrow gravel roads and also for various other narrow roads. It may, however, be used for various other roads and for various other purposes. By means of the adjustable chains 5 5 the width of the drag, or the distance apart of the halves of the drag, may be adjusted as desired. The spacing bars 2 2 and the braces 6 6 being above the middle of the drag plates 1 1 as shown in Fig. 2, give a considerable clearance from the ground and therefore prevent the drag from becoming clogged very readily.

The drag of Fig. 4 is formed from the drag of Fig. 1, by doing away with a few of the parts of Fig. 1 and rearranging the other parts as shown in Fig. 4. In this form of drag the backward slope is all toward one side of the drag, the drag plates 1 1 being placed in three rows of three plates each and spaced from each other by the spacing bars 2 2 preferably as shown. In this form of the drag the cross bars or braces 4 4 are connected between the spacing bars 2 2 preferably as shown. The drag plates 1 1 and the spacing bars 2 2 are held in place by the bolts 3 3, the latter being provided with medially disposed shoulders 18 thereon, as shown in Fig. 3, so that the overlapping joints 16 16 between the plates 1 1 of the various rows will be maintained in a loose condition, even if the nuts on the bolts 3 3 are screwed up tight thereon, to enable the drag plates of the various rows to conform to the curvature of the road grade. In this way a flexible drag of the character shown in Fig. 4 is provided. In this form of drag the draft rod 9 and the chains 10 11 are all suitably adjusted in length as shown in Fig. 4, to give the required backward slope to the drag. It will be readily understood that this backward slope may be made whatever is desired.

The form of drag shown in Fig. 4 is especially adapted for dragging one side of a road at a time, where the road is wide and it is desired to bring a good deal of the dirt from the sides of the road to the middle. This drag being capable of conforming to the curvature of the road, maintains the desired grade. This drag, however, may be used on various roads and for various purposes. Thus the advantages of the present improved convertible drag, over various forms of single drags which are not adapted for various purposes, can be readily seen. Then, again, at the cost of one drag I have two complete drags of widely different characters, adapted for a great variety of purposes.

The draft ring 12, shown in detail in Fig. 5, is provided with notched portions 17 17 adapted to grasp and hold links of the respective draft chains 10 11 therein to prevent the slipping of the chains through the ring 12. The ring 12 is also provided with curved recesses 19 19 therein to accommodate the rings on the ends of the draft rods 8 9 as shown.

Of course I do not wish to limit this invention to all of the particular details herein set forth, as various modifications thereof may be made without departing from the scope of the appended claims.

What I claim as my invention is:

1. A drag of the character herein set forth, composed of two halves, each half comprising a plurality of drag plates arranged one behind another and sloping rearwardly toward the middle of the drag; means for holding the said halves of the drag at a given distance from each other, and an evener trailing at the rear of the drag for leveling off the ridge formed between the said halves.

2. A drag of the character herein set forth, composed of two halves, each half comprising a plurality of drag members arranged one behind another and sloping rearwardly toward the middle of the drag, adjustable draft members for varying the rearward slope of the said drag members, and adjustable means for holding the said halves of the drag at various given distances from each other.

3. In a drag having a plurality of independently-operable drag members adapted to be given a rearward slope, adjustable draft mechanism for varying the rearward slope of the said drag members as desired.

4. In a drag of the character herein set forth, composed of two halves, each half comprising a plurality of drag members arranged one behind another, adjustable means for holding the said halves of the drag at various given distances from each other.

5. A drag of the character herein set forth, composed of two halves, each half comprising a plurality of drag members arranged one behind another and sloping rearwardly, means for holding the said halves of the drag at a given distance from each other, and an evener trailing at the rear of the drag for leveling off any ridge formed by the drag members.

6. A convertible drag of the character herein set forth, composed of draft mechanism and two drag portions, each drag portion comprising a plurality of drag plates arranged one behind another and sloping rearwardly toward the middle of the drag, and also having other drag plates trailing in the rear of the drag for leveling off the ridge formed between the said drag portions; the parts of the drag being constructed so that the said drag plates may be arranged in a plurality of rearwardly sloping rows, one row substantially behind another, to provide another form of drag, the said draft mechanism being adapted to be adjusted to give various rearward slopes to the drag.

7. A convertible drag of the character herein set forth, composed of draft mechanism and two drag portions, each drag portion comprising a plurality of drag members arranged one behind another, and also having other drag members trailing in the rear; the parts of the drag being constructed so that the said drag members may be arranged in a plurality of rows, one row substantially behind another, to provide another form of drag, the draft mechanism being adjustable to give various rearward slopes to the drag.

8. In a drag of the character herein set forth having a plurality of drag members, adjustable draft mechanism for giving the said drag members various rearward slopes, and means for connecting the said drag members to divide the drag in halves, each half comprising a plurality of the drag members arranged one behind another, or for connecting the said drag members in rows, one row behind another, whichever is desired.

9. In a drag having independently-operable drag sections, adjustable means for holding the said sections at various given distances from each other.

10. A drag of the character herein set forth, composed of independently-operable halves, each half comprising a plurality of drag members arranged one behind another and sloping rearwardly, and adjustable means for holding the said halves at various given distances from each other.

11. In a drag of the character set forth, a plurality of drag members connected to divide the drag into independently-operable sections, each section comprising a plurality of the drag members arranged one behind another, the parts of the drag being constructed so that the said drag members may be connected in rows, one row behind another, to provide another form of drag.

As inventor of the foregoing I hereunto subscribe my name, this 28th day of March, 1910.

EDWARD J. HICKOK.

Witnesses:
  FREDERICK R. PARKER,
  FRANCES K. PARKER.